United States Patent [19]

Matthys et al.

[11] 4,266,953

[45] May 12, 1981

[54] MECHANISM FOR REMOVING DUST PARTICLES FROM AN ENGINE AIR CLEANER

[75] Inventors: Bernard A. Matthys, Dakota; Donald W. Schoen, Ramsey; Carl E. Anderson, Hennepin, all of Minn.

[73] Assignee: The United States of America as represented by the Secretary of the Army, Washington, D.C.

[21] Appl. No.: 155,340

[22] Filed: Jun. 2, 1980

[51] Int. Cl.³ .............................................. B01D 46/04
[52] U.S. Cl. ...................................... 55/294; 55/283; 55/302
[58] Field of Search .......................... 55/294, 302, 383

[56] References Cited

U.S. PATENT DOCUMENTS 2,516,680   7/1950   Culpepper ............................ 55/294

FOREIGN PATENT DOCUMENTS 738349   8/1943   Fed. Rep. of Germany ............ 55/294

Primary Examiner—Bernard Nozick
Attorney, Agent, or Firm—Peter A. Taucher; John E. McRae; Nathan Edelberg

[57] ABSTRACT

A reversed air system for periodically cleaning one or more filter panels of an engine air cleaner. The cleaner system includes an air nozzle at one face of the filter panel and an air receiver at the other panel face. The nozzle and receiver are arranged on ball screws for transverse movement across the filter panel faces. Under our invention, the air receiver has flexible connections with ball nuts that travel along the associated ball screws. The flexible connections have swing flexibility in different planes to alleviate potential jamming tendencies due to manufacturing tolerances, installation variances, and ball screw sag due to the unsupported length of each screw.

4 Claims, 6 Drawing Figures

MECHANISM FOR REMOVING DUST PARTICLES FROM AN ENGINE AIR CLEANER

The invention described herein may be manufactured, used, and licensed by or for the Government for governmental purposes without payment to us of any royalty thereon.

BACKGROUND AND SUMMARY OF THE INVENTION

This invention relates to an air cleaner for an engine, particularly a turbine engine having a very high air flow requirement, e.g. 10,000 cubic feet per minute. The air cleaner includes a down-flow air passage box having means therein for supporting two rectilinear air filter panels in inclined upright attitudes. The filter panels are periodically cleaned of dirt accumulations by means of a traveling nozzle and air receiver located on opposite faces of each panel. The air nozzle discharges relatively high pressure air at approximately 40 p.s.i.g. through the filter media into a receiver that is connected to a vacuum-producing fan; the pressurized air containing entrained dirt particles is removed by the fan to keep the panel relatively clean for continued usage on the engine.

The present invention is directed to flex-type connection mechanisms for mounting each air receiver on a pair of rotary ball screws, whereby the receiver will be prevented from jamming or otherwise malfunctioning during its travel across the face of the air filter panel. The flexible connections compensate against a plurality of potential jam situations that can occur due to manufacturing tolerances and service conditions.

THE DRAWINGS

Figure 1:
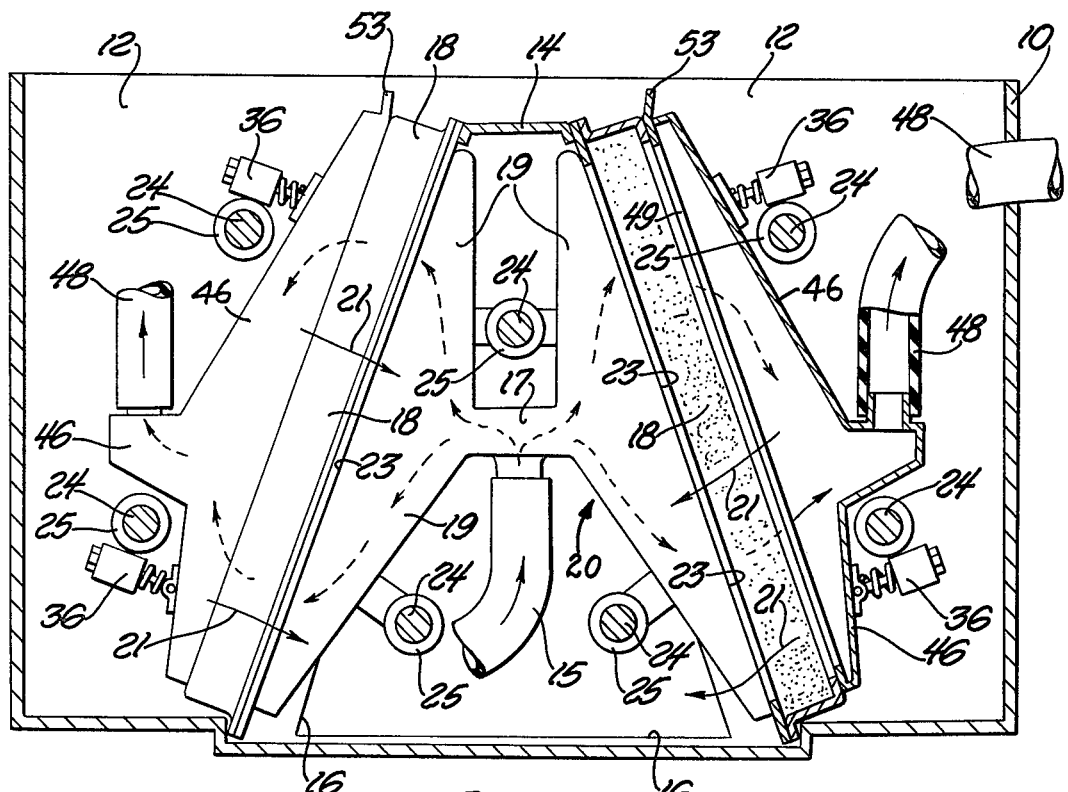
FIG. 1 is a sectional view taken through an engine air cleaner embodying our invention.

The illustrated air cleaner includes a rectangular box 10 having an air intake space 12. The box contains two conventional air filter panels 18 of the pleated paper type arranged in inverted V configuration (FIG. 1), with the upper edge of each filter panel resting against a stationary separator bar 14. Dust-laden air flows obliquely downwardly through each filter panel, as designated by arrows 21. The filtered air is drawn to the engine through a filter outlet opening 16 in one end wall of box 10. Automatic cleaning of panels 18 is accomplished by a reverse air system that includes a central air nozzle 20 comprising two hollow triangular housings 19 extending from a hollow bridge section 17 that receives pressurized air from a remote source via a flexible hose or tube 15. Pressurized air flows from bridge section 17 into hollow sections 19 and thence through exit slots in nozzle walls 23. Nozzle air is then directed outwardly through the filter 18 media into aligned hollow receivers 46, each having an air exit hose 48 leading to a small exhaust fan, not shown. Nozzle housings 19 and each receiver 46 are provided with slot-type orifices in the face areas thereof presented to filter panel 18; one such orifice is shown at 49 in FIGS. 1 and 5. Each orifice extends the full width of panel 18.

Figure 3:
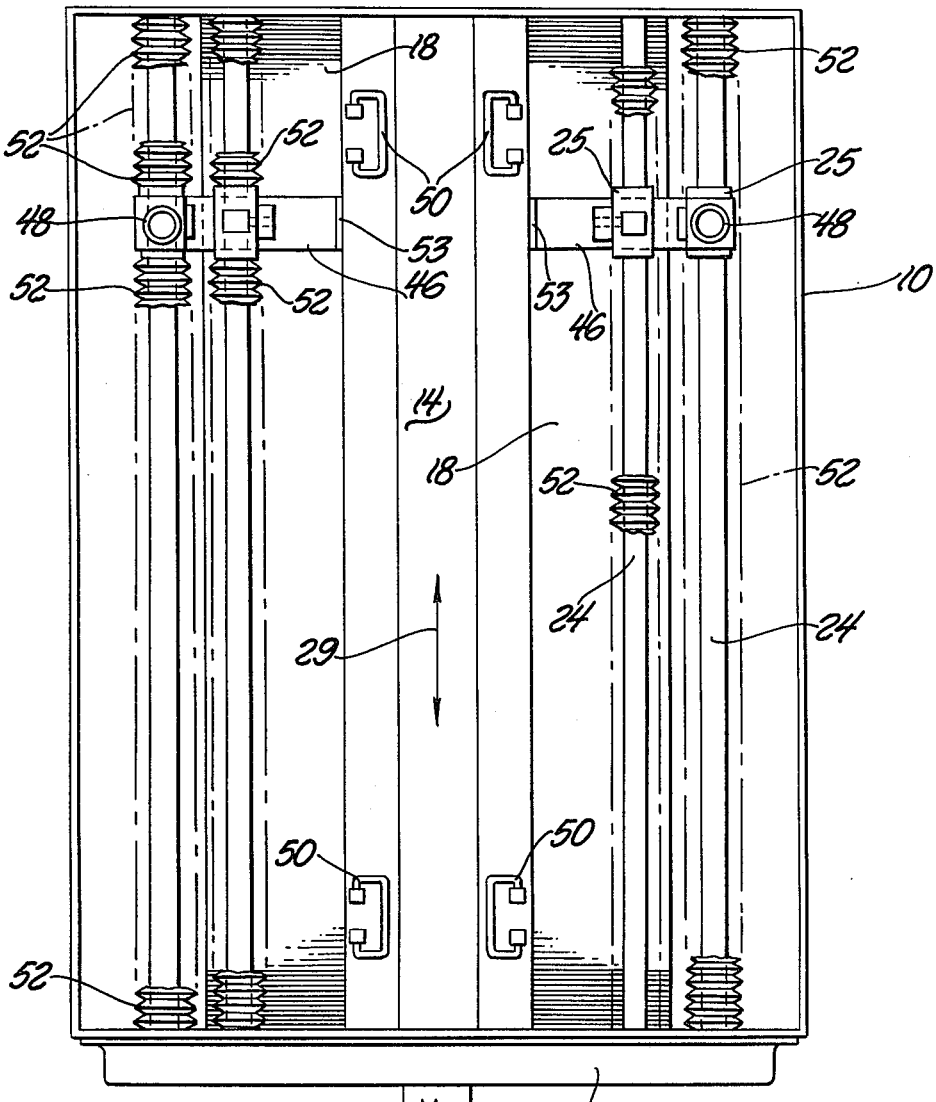
FIG. 3 is a top plan view of the FIG. 1 air cleaner.

Nozzle 20 is supported on three ball screws 24 for periodic movement back and forth across box 10. Similarly, each receiver 46 is supported on two ball screws 24, making a total of seven ball screws in the system. As best seen in FIG. 3, each receiver 46 occupies only a small fraction of the transverse space; non-illustrated nozzle 20 is aligned with the receivers. Normally, receivers 46 and nozzle 20 are positioned at one end of box 10, leaving substantially the entire plan dimension of the box clear for down-flow of dusty air through the upright inclined air filter panels 18.

Figure 2:
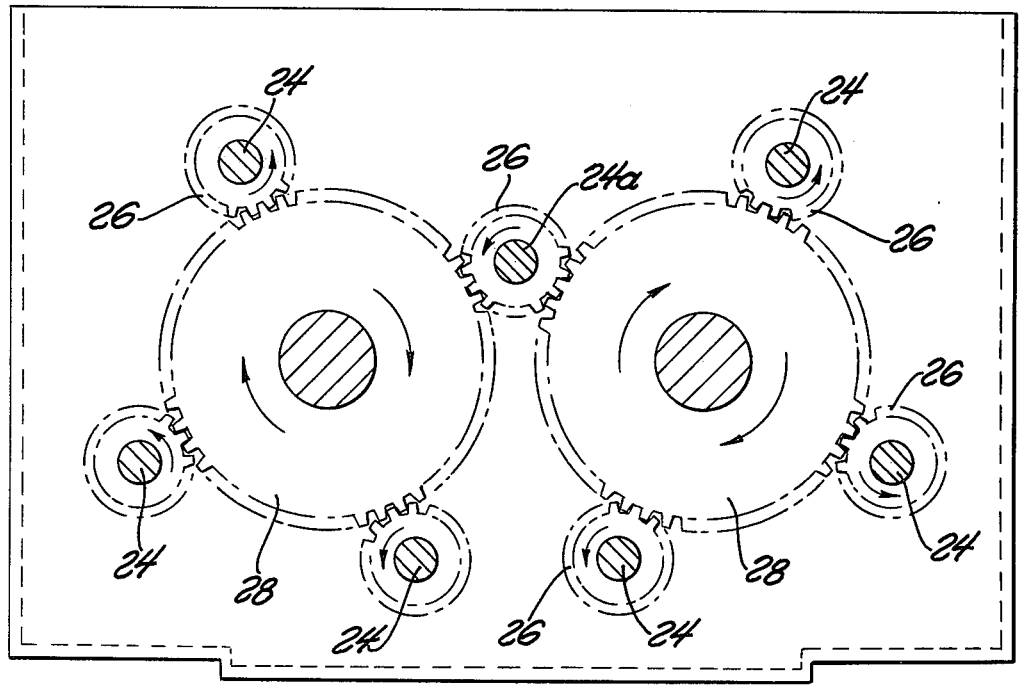
FIG. 2 is a view similar to FIG. 1 but taken through a gear housing at one end of the air cleaner.

Periodically, when filter panels 18 become plugged with particulates, a pressure switch, not shown, responds to the increased pressure differential across the filter to actuate a small electric motor 32 (see FIG. 3). The motor shaft 24a (FIG. 2) is connected to one of the aforementioned seven ball screws. Shaft 24a also mounts a small gear 26 that meshes with two large gears 28 that in turn mesh with six smaller gears 26 carried by the other ball screws 24. The system includes seven conjointly rotating ball screws for supporting nozzle 20 and the two receivers 46.

Each ball screw meshes with a ball nut 25 that connects with nozzle 20 or one of receivers 46. Each of the seven ball screws is a reversible ball screw having crisscrossed right and left hand threads meshed with the circulating balls in the cooperating ball nut 25 so that nozzle 20 and the two receivers can move back and forth in the arrow 29 directions (FIG. 3) without requirement for changing the direction of motor 32 rotation. Motor 32 is automatically de-energized when the aforementioned pressure switch senses a sufficiently small pressure drop indicating that the filter panels 18 are in cleaned conditions. The operation takes place during normal running of the engine without need for engine shut-down or other effect on engine operation. The seven ball screws 24 are protected against entry of dust into the screw threads by axially compressible bellows 52 (FIG. 3).

Figure 6:
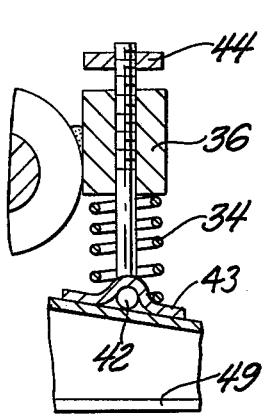
FIG. 6 is a sectional view illustrating another structural detail.
Figure 4:
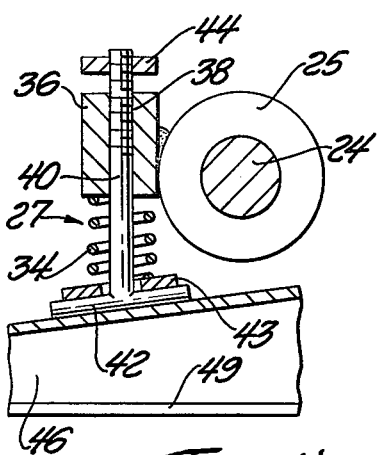
FIG. 4 is a sectional view illustrating a structural detail used in the FIG. 1 air cleaner.
Figure 5:
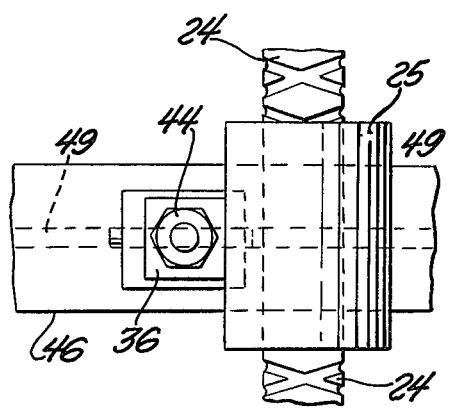
FIG. 5 is a view taken at right angles to FIG. 4.

Each receiver 46 is connected to the associated ball nut 25 by a flexible connection of the type shown in FIGS. 4 through 6. The flexible connection shown in FIG. 4 includes a tubular guide 36 affixed to ball nut 25 for slidable guidance of shaft section 40 of tee bolt 38. The transverse pin section 42 of the tee bolt extends normal to the axis of ball screw 24 and is hingedly captured within a curved bracket 43 affixed to receiver 46. A coil spring 34 biases the receiver away from the axis of ball screw 24 within the travel limits imposed by a nut 44 that is threaded onto shaft section 40.

The flexible connection shown in FIG. 6 includes components similar to the FIG. 4 components except that pin section 42 extends parallel to the axis of ball screw 24. The FIG. 4 connection accommodates receiver adjustment or play in planes parallel to the ball screw axis. The FIG. 6 connection accommodates receiver adjustment or play in planes normal to the ball screw axis. Each of the two receivers 46 (FIG. 1) has one FIG. 4 swing flex connection and one FIG. 6 swing flex connection to accommodate play in two different planes, parallel and normal to the ball screw axes.

The FIG. 6 swing flexibility is necessary or desirable because of tolerances on the ball screw centerline spacings and the relatively long unsupported length of each ball screw, about forty inches in one case. A swing movement of about one-sixteenth inch will usually accommodate the tolerances and ball screw sag experienced during movement of the ball nuts. The FIG. 4 swing flexibility is necessary or desirable to compensate for a slight twist that could otherwise be imposed on the receiver during the motion-reversal period at the end of each cycle; such twist forces can produce a reaction force that results in binding between the ball nut and associated screw. For example, should one of the two ball screws be slightly ahead of the other at the time of motion reversal then for a short period the receiver will be subjected to a rightward impetus at one ball nut and a leftward impetus at the other ball nut, thereby producing the undesired receiver twist and ball nut jam tendency. The FIG. 4 swing flexing motion permits the associated ball nut to keep traveling without transmitting the motion to the receiver, thereby relieving the twist forces that would be imposed on the receiver. The FIG. 4 coil spring takes up slack or lost motion. In a perfect system there would of course be no jam problem; the problem is due to small manufacturing tolerances and installation variations due to limits on human ability to set each receiver in precisely the most favorable attitude.

The coil springs associated with the FIG. 4 and FIG. 6 flex connections serve the useful purpose of continually biasing the associated receiver into close proximity with the metal edge areas of filter panel 18 even though the panel surface might be uneven or bowed due to gage of the metal, manufacturing variances, lack of panel support along the panel central axis, etc. By continually biasing the receiver near the face of the filter panel it is possible to avoid excessive air gaps as would deleteriously reduce the suction applied to the media surface. Springs 34 are also advantageous when it becomes necessary to remove the filter panel for inspection, repair or replacement. At such times, the bail type handles 50 (FIG. 3) can be grasped to lift the filter panel from its supported position, with coil springs 34 undergoing slight compression to accommodate clearance motion of the receiver. During insertional movement of a replacement filter panel, the panel can be manipulated so that its lower edge presses outwardly against tab 53 at the upper end of receiver 46, thereby tilting the receiver away to permit entry of the panel into its operating space.

The present invention is concerned primarily with the flexible connections shown in FIGS. 4 and 6. Such connections are useful in pairs on each receiver.

We do not desire to be limited to the exact details of construction shown and described for obvious modifications will occur to a person skilled in the art.

We claim:

1. An engine air cleaner comprising downflow air passage box; means for supporting a rectilinear air filter panel in an inclined upright attitude in the box; means for periodically removing dust particle accumulations from the filter panel comprising an air nozzle located on the downstream face of the panel, said nozzle having a slot-type orifice for discharging pressurized air through the filter media to dislodge particulates embedded in the media; an air receiver located on the upstream face of the panel, said receiver having a slot-type orifice for capturing the pressurized air and entrained particulates after passage thereof through the media; means supporting the nozzle and receiver for linear travel across the filter panel, comprising first and second parallel ball screws extending transversely across the box, first and second ball nuts meshed with respective ones of the screws, a first flexible connection between the first nut and receiver, and a second flexible connection having swing flexibility in a plane normal to the ball screw axis, said second flexible connection having swing flexibility in a plane parallel to the ball screw axis.

2. The air cleaner of claim 1: each flexible connection including spring means therein having a line of action normal to the plane of the filter panel, whereby the receiver maintains close proximity to the panel surface while permitting removal of said panel from its supported position when necessary for inspection or replacement.

3. The air cleaner of claim 2: each flexible connection comprising a tubular guide affixed to the respective ball nut, a tee bolt having a threaded shaft section extending through the guide and a smooth pin section hingedly connected to the receiver, a compression spring surrounding the shaft section to bias the receiver away from the nut, and a nut screwed onto the shaft section to retain the tee bolt in the tubular guide.

4. The air cleaner of claim 3: the first flexible connection having its tee bolt oriented so that its smooth pin section has its axis arranged parallel to the ball screw axis, the second flexible connection having its tee bolt oriented so that its smooth pin section has its axis arranged normal to the ball screw axis.

* * * * *